(12) United States Patent
Lin et al.

(10) Patent No.: US 10,241,232 B2
(45) Date of Patent: Mar. 26, 2019

(54) GEOMECHANICAL AND GEOPHYSICAL COMPUTATIONAL MODEL FOR OIL AND GAS STIMULATION AND PRODUCTION

(71) Applicant: Halliburton Energy Services, Inc., Houston, TX (US)

(72) Inventors: Avi Lin, Houston, TX (US); Dinesh Ananda Shetty, Houston, TX (US); Jie Bai, Houston, TX (US); Srinath Madasu, Houston, TX (US); Joshua L. Camp, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/111,111

(22) PCT Filed: Feb. 3, 2015

(86) PCT No.: PCT/US2015/014221
§ 371 (c)(1),
(2) Date: Jul. 12, 2016

(87) PCT Pub. No.: WO2015/117118
PCT Pub. Date: Aug. 6, 2015

(65) Prior Publication Data
US 2016/0341850 A1 Nov. 24, 2016

Related U.S. Application Data
(60) Provisional application No. 61/934,943, filed on Feb. 3, 2014.

(51) Int. Cl.
*G01V 99/00* (2009.01)
*E21B 43/26* (2006.01)
(Continued)

(52) U.S. Cl.
CPC ........ *G01V 99/005* (2013.01); *E21B 41/0092* (2013.01); *E21B 43/26* (2013.01);
(Continued)

(58) Field of Classification Search
CPC combination set(s) only.
See application file for complete search history.

(56) References Cited

U.S. PATENT DOCUMENTS 6,356,860 B1 3/2002 Barnette
7,043,413 B2 5/2006 Ward et al.
(Continued)

FOREIGN PATENT DOCUMENTS

WO WO2013016733 A1 1/2013

OTHER PUBLICATIONS

Fu, Pengcheng, et al., "Fully Coupled Geomechanics and Discrete Flow Network Modeling of Hydraulic Fracturing for Geothermal Applications", Proceedings, Thirty-Sixth Workshop on Geothermal Reservoir Engineering Stanford University, Stanford, California, Jan. 31-Feb. 2, 2011.*
(Continued)

*Primary Examiner* — Aniss Chad
*Assistant Examiner* — Justin C Mikowski
(74) *Attorney, Agent, or Firm* — John W. Wustenberg; Parker Justiss, P.C.

(57) ABSTRACT

In some aspects, a number of subsystem models is accessed by a computer system. Each subsystem model represents dynamic attributes of a distinct physical subsystem in a subterranean region. At least one of the number of subsystem models represents dynamic attributes of a mechanical subsystem in the subterranean region. A discrete fracture network (DFN) model representing a fracture network in the subterranean region is accessed at the computer system. The DFN model includes junction models. Each junction model
(Continued)

represents interactions between a respective set of subsystem models associated with the junction model. Junction variables of the junction model can be defined based on dynamic attributes of the respective set of subsystem models associated with the junction model. A stimulation treatment for the subterranean region can be simulated by operating the DFN model including the junction variables.

18 Claims, 6 Drawing Sheets

(51) Int. Cl.
    *E21B 41/00*      (2006.01)
    *E21B 47/00*      (2012.01)
    *E21B 49/00*      (2006.01)
    *E21B 49/08*      (2006.01)
    *G06F 17/50*      (2006.01)
    *G06F 17/11*      (2006.01)
    *G06F 9/455*      (2018.01)
    *E21B 43/267*      (2006.01)
    *E21B 47/06*      (2012.01)

(52) U.S. Cl.
    CPC .............. *E21B 47/00* (2013.01); *E21B 49/00* (2013.01); *E21B 49/08* (2013.01); *G06F 17/11* (2013.01); *G06F 17/5009* (2013.01); *G06F 17/5018* (2013.01); *E21B 43/267* (2013.01); *E21B 47/06* (2013.01); *E21B 47/065* (2013.01); *G01V 99/00* (2013.01); *G06F 9/455* (2013.01); *G06F 2217/16* (2013.01)

(56) References Cited

U.S. PATENT DOCUMENTS

| | | | |
|---|---|---|---|
| 7,181,380 B2* | 2/2007 | Dusterhoft | E21B 43/00 166/250.07 |
| 8,204,727 B2 | 6/2012 | Dean et al. | |
| 8,898,044 B2* | 11/2014 | Craig | E21B 43/16 702/6 |
| 2010/0076738 A1 | 3/2010 | Dean et al. | |
| 2010/0204972 A1 | 8/2010 | Hsu et al. | |
| 2011/0120718 A1 | 5/2011 | Craig | |
| 2011/0125476 A1* | 5/2011 | Craig | E21B 43/16 703/10 |
| 2011/0257944 A1* | 10/2011 | Du | E21B 43/267 703/2 |
| 2012/0203516 A1* | 8/2012 | Hamann | G06F 17/5009 703/2 |
| 2012/0310613 A1 | 12/2012 | Moos et al. | |
| 2013/0090902 A1* | 4/2013 | Yao | E21B 43/26 703/2 |
| 2013/0204588 A1 | 8/2013 | Copeland | |
| 2013/0332129 A1* | 12/2013 | Xia | G06F 17/5018 703/9 |
| 2013/0346042 A1 | 12/2013 | Shen et al. | |
| 2014/0066395 A1 | 3/2014 | Cho et al. | |
| 2014/0066419 A1 | 3/2014 | Chen et al. | |
| 2014/0222392 A1* | 8/2014 | Johnson | G01V 1/40 703/2 |
| 2014/0222393 A1 | 8/2014 | Bai et al. | |
| 2014/0262232 A1* | 9/2014 | Dusterhoft | E21B 43/26 166/250.1 |
| 2014/0278316 A1* | 9/2014 | Dusterhoft | E21B 43/26 703/10 |
| 2015/0051878 A1 | 2/2015 | Kulkarni et al. | |
| 2015/0066455 A1 | 3/2015 | Madasu et al. | |
| 2015/0066462 A1 | 3/2015 | Shetty et al. | |
| 2015/0186563 A1 | 7/2015 | Johnson et al. | |
| 2016/0319641 A1 | 11/2016 | Camp et al. | |

OTHER PUBLICATIONS

Ben, Y., et al., "Simulating Hydraulic Fracturing With Discontinuous Deformation Analysis", American Rock Mechanics Association, ARMA-2012-480, Jun. 2012.*
T. Koyama et. al., "A numerical study on differences in using Navier-Stokes and Reynolds equations for modeling the fluid flow and particle transport in single rock fractures with shear", International Journal of Rock Mechanics & Mining Sciences 45 (2008) 1082-1101.*
Simon A. Mathias, et. al., "Hydraulic Fracture Propagation with 3-D Leak-off", Transp Porous Med (2009) 80:499-518.*
Bank et al., "Mesh Smoothing Using A Posteriori Error Estimates," Society for Industrial and Applied Mathematics, Journal on Numerical Analysis, vol. 34, No. 3, Jun. 1997, 19 pages.
Bank, "PLTMG: A Software Package for Solving Elliptic Partial Differential Equations Users' Guide 9.0," Department of Mathematics, University of California at San Diego, Mar. 2004, 140 pages.
Diaz et al., "A Method of Grid Optimization for Finite Element Methods," Computer Methods in Applied Mechanics and Engineering 41 (1983), pp. 29-45.
PCT International Search Report and Written Opinion of the International Searching Authority, PCT/US2015/014208, dated Apr. 30, 2015, 12 pages.
Copeland et al., "A Unified Leakoff and Flowback Model for Fractured Reservoirs," Aug. 25, 2014, Denver, Colorado; 10 pages.
PCT International Search Report and Written Opinion of the International Searching Authority, PCT/US2015/014221, dated May 8, 2015, 10 pages.

* cited by examiner

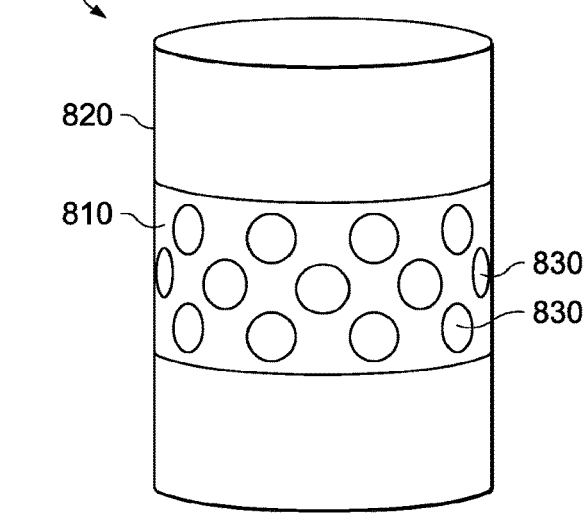
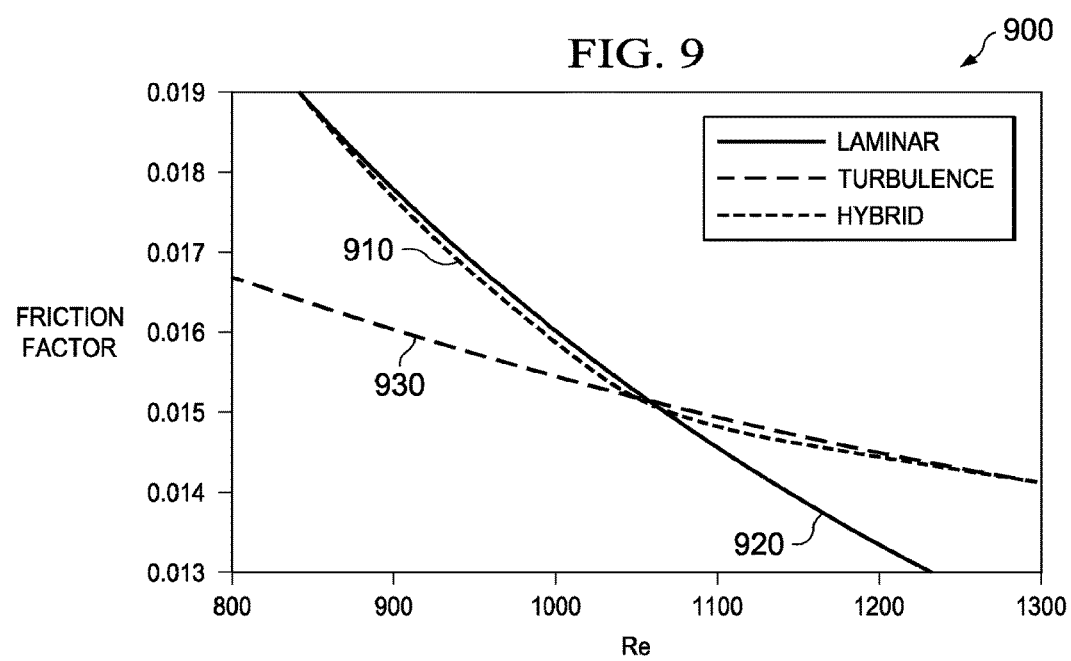

GEOMECHANICAL AND GEOPHYSICAL COMPUTATIONAL MODEL FOR OIL AND GAS STIMULATION AND PRODUCTION

CROSS-REFERENCE TO RELATED APPLICATIONS

This application is a U.S. National Phase Application under 35 U.S.C. § 371 and claims the benefit of priority to International Application Serial No. PCT/US2015/014221, filed on Feb. 3, 2015, which claims the benefit of priority to U.S. Provisional Application Ser. No. 61/934,943, filed on Feb. 3, 2014, the contents of which are hereby incorporated by reference.

BACKGROUND

The following description relates to modeling and simulating a subterranean region, for example, for simulating hydrocarbon (oil and gas) stimulation and production processes in the subterranean region.

During a fracture treatment, fluids are pumped under high pressure into a rock formation through a wellbore to fracture the formation and increase permeability, which subsequently enhances hydrocarbon production from the formation. Applied mathematical models can be used to numerically simulate certain aspects of a hydraulic fracturing treatment.

DESCRIPTION OF DRAWINGS

FIG. 8 is a diagram showing aspects of an example perforation area of a wellbore.

FIG. 9 is a plot showing an example hybrid friction model.

Like reference symbols in the various drawings indicate like elements.

DETAILED DESCRIPTION

Figure 1:
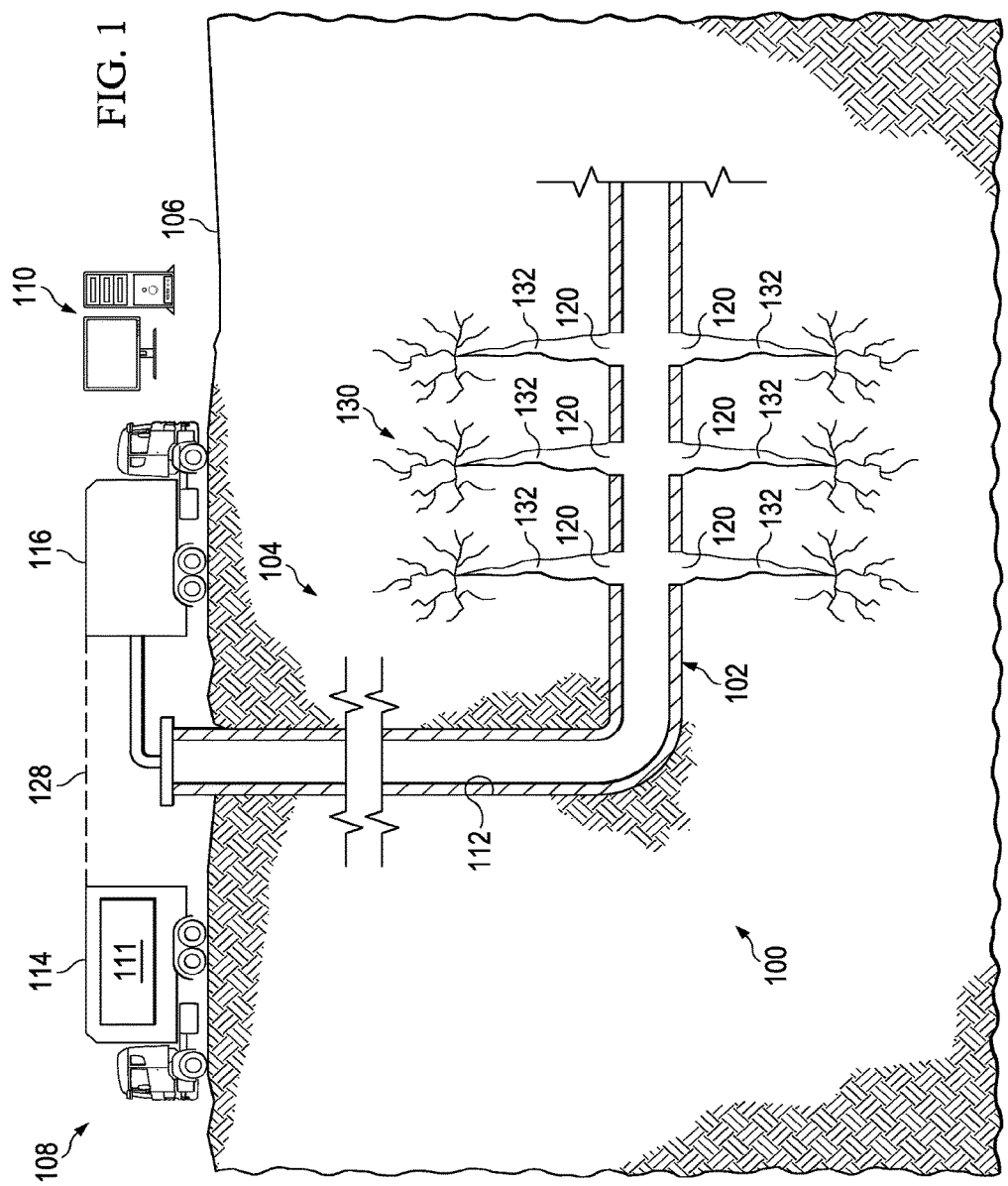
FIG. 1 is a schematic diagram of an example well system.

Some aspects of the following description relate to providing a general computational model for simulating a subterranean region. The general model can capture dynamic, fully coupled fluid-solid mechanics of a fracture network in a subterranean region and its various interactions with the matrix and formations, for example, based on a discrete fracture network (DFN) model and its associated and supporting models. The general model can serve as a fundamental computational architecture, for example, for hydraulic fracturing simulation algorithms and software.

In some implementations, a stimulation treatment (e.g., an injection treatment, flow-back/leak-off process, etc.) of a subterranean region can include a number of unconventional geomechanical and geophysical processes. In some instances, the subterranean region can be decomposed into multiple physical components or subsystems, such as one or more of a wellbore, a junction, a perforation zone, a fracture (or fracture network), a solid rock block, or a reservoir block. The fluid flow and the solid rocks are interacting with each other throughout the entire physical domain. As such, numerical methods for modeling and simulating the subterranean region can be extremely complicated and computationally intensive.

For instance, the overall physical system of the subterranean region can be decomposed into a collection of subdomains or subsystems. The physics of each subsystem are coupled, yet they can be described by independent mathematical models (e.g., solid rocks by Newton's law and linear elasticity, fluid fracture flow by Navier-Stokes, the reservoir by porous media and Darcy equations, etc.). In order to ensure full system stability, in some instances, these mathematical models (also referred to as subsystems models) can be coupled implicitly. At the same time, the numerical method applied towards each subsystem model need to have sufficiently high accuracy in order to properly capture relevant dynamic attributes (including values, properties, variations, etc.) of the underlying physical systems. The combination of these two aspects can result in very large, tightly coupled system of equations that make it difficult to achieve solutions in engineering-relevant time frames.

Example techniques are provided for giving a hierarchical description of the subterranean region based on tight coupling between the physical components and their unique mathematical features. The example hierarchical model includes a discrete fracture network (DFN) model that serves as a basic computational geometry or architecture for modeling and simulating the subterranean region for the fractures complex domains. Rather than spreading subsystem models over all the physical components of the subterranean region, the example techniques can treat the DFN model as a skeleton and generate subsystem models based on the DFN model. For example, the DFN model can model a fracture network in the subterranean region. The DFN model can include subsystem models that represent individual fractures of the fracture network. For example, a fracture can be represented by a plane (in 2-dimensions) or a straight line (in one dimension). The formation and reservoir around the fracture network can be partitioned into multiple rock blocks or reservoir blocks. Rock-block subsystem models and reservoir block subsystem models can be generated around the fracture subsystem models, for example, based on the computational geometry of the DFN model. Particularly, the DFN model can include models for the junction points and junction domains/areas that represent interactions between two or more of the subsystems spread around the DFN model, which coherently couple the subsystem models and significantly reduce the size and computational cost of the original numerical system. In some implementations, the example techniques based on the DFN model can reduce to a core system that involves the values of the geomechanics and geophysics variables at the junction models, providing a close-to-optimal computational reduction.

In some implementations, the example techniques allow independent implementations of numerical discretization of the multiple subsystem models. For example, each subsystem model can adopt a respective discretization method (e.g., finite differences, finite elements, finite volumes, spectral methods, etc.) and the discretization method may be different from a subsystem model to a subsystem model. In some implementations, the only restriction on the numerical schemes applied to a subsystem model is that they can allow for the proper physical and mathematical interactions on the boundaries between the different domains that the subsystem connects or is otherwise associated with. The example techniques can lead into an optimal computational methodology for a fast simulation of the unconventional treatment, which can further enhance the computational efficiency by implementing it on a parallel or a distributed computational environment, using the natural parallel decomposition described above.

In some implementations, the example techniques allow reducing subsystem variables in terms of junction variables of the junction models. For example, the techniques can reduce the discretization of each sub-domain, along with relevant interdependent couplings, in terms of junctions variables located at common points that strongly couple all the sub-systems.

In some implementations, the example techniques can significantly reduce the computational time required to achieve solutions regardless of the physical dimension and/or numerical resolution used in each subsystem model. For example, the number of degrees of freedom used in individual fracture subsystem models does not increase the size of the overall reduced system matrix obtained based on the DFN model. Additionally, the example techniques allow extension of a primarily 1-dimensional (1D) or a 2-dimensional (2D) system to 2D/3-dimensional (3D) system without a substantial increase in computational time.

The example techniques are robust and general, and thus can be applied to many areas of commercial interest that require highly accurate and efficient numerical calculations. For example, the example techniques can be applied not only to hydraulic fracturing simulations, but also to other physical systems such as the performance of a matrix acidizing simulation.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, deviated, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, carbonate, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, deviated wellbores, horizontal wellbores, curved wellbores, or combinations of these and others.

The example injection system 108 includes instrument trucks 114, pump trucks 116, and an injection treatment control subsystem 111. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these. The injection system 108 may inject fluid into the formation above, at, or below a fracture initiation pressure for the formation; above, at, or below a fracture closure pressure for the formation; or at another fluid pressure.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102, or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or combinations.

The injection system 108 may also include surface and down-hole sensors to measure pressure, rate, temperature, or other parameters of treatment or production. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, height, shape, geometry, or aperture. Fractures can extend in any direction or orientation, and they may be formed at multiple stages or intervals, at different times, or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate nodes or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection system.

In some cases, the simulations are based on data obtained from the well system 100. For example, pressure meters, flow monitors, microseismic equipment, tiltmeters, or other equipment can perform measurements before, during, or after an injection treatment, and the computing subsystem 110 can simulate fluid flow based on the measured data. In some cases, the injection treatment control subsystem 111 can select or modify (e.g., increase or decrease) fluid pressures, fluid densities, fluid compositions, proppant size and type, and other control parameters based on data provided by the simulations. In some instances, data provided by the simulations can be displayed in real time during the injection treatment, for example, to an engineer or other operator of the well system 100.

Some of the techniques and operations described herein may be implemented by one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
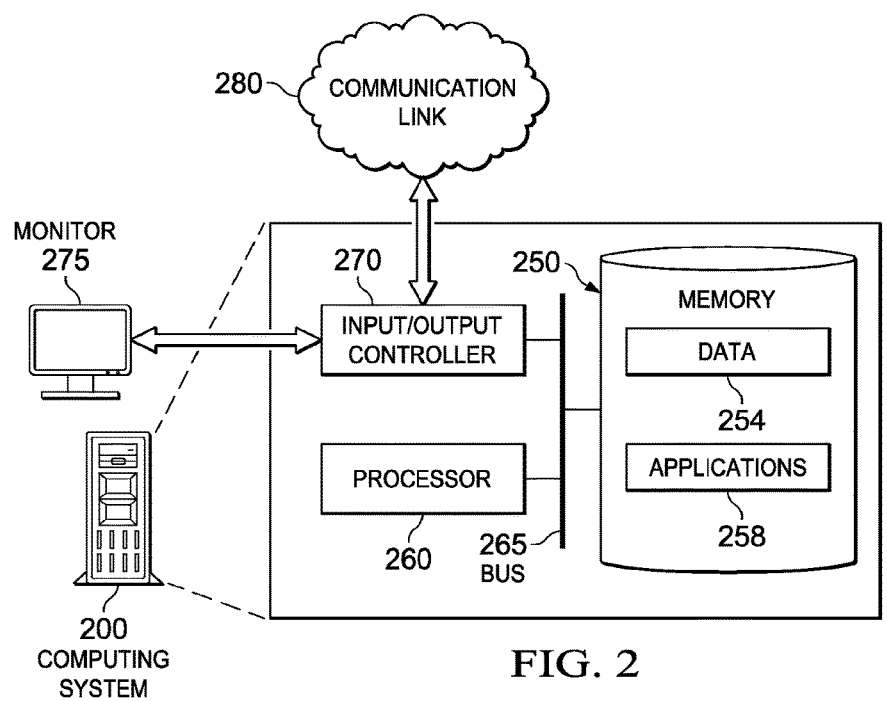
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g., a monitor 275, a mouse, a keyboard, or other input/output devices) and to a communication link 280. The input/output devices can receive or transmit data in analog or digital form over communication links such as a serial link, a wireless link (e.g., infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example, the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, reservoir properties, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-10. For example, the applications 258 can include modules or algorithms for generating a distribution of grid points. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-10. The input data received by the processor 260 or the output data generated by the processor 260 can include any of the treatment data, the geological data, the fracture data, or any other data.

Figure 3:
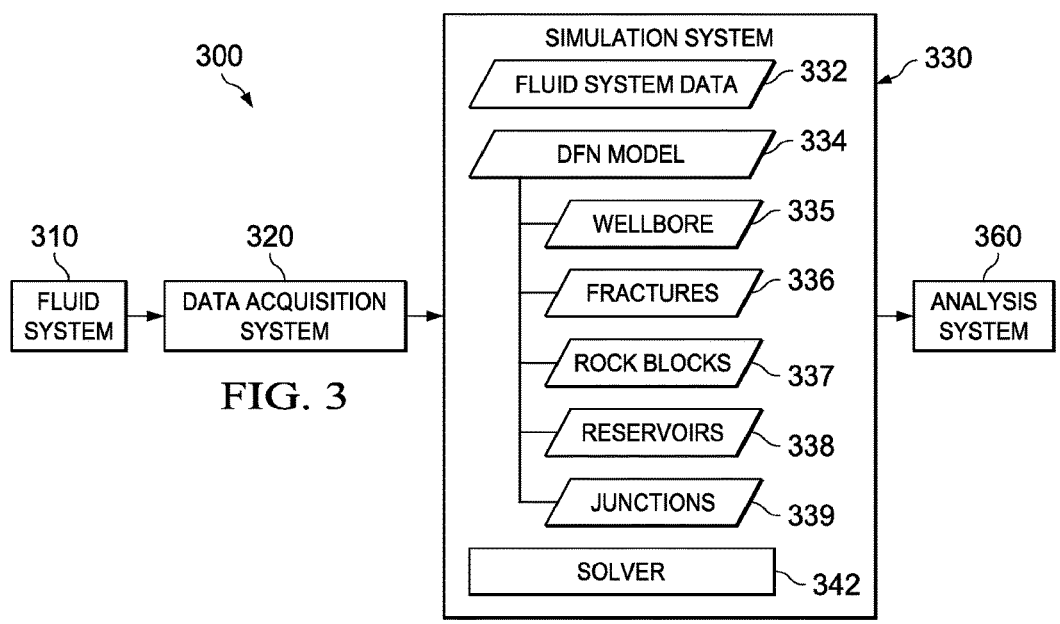
FIG. 3 is a diagram of an example system architecture.

FIG. 3 is a diagram of an example system architecture 300. The example system architecture 300 can be used to model fluid flow in a well system environment. For example, the architecture 300 can be used to simulate fluid flow in an injection treatment of the subterranean region 104 shown in FIG. 1. In some instances, the architecture 300 is used to model fluid flow and other aspects of a stimulation treatment or other activities (e.g., drilling, production, etc.) in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically induced fractures, etc.), or combinations of these and other types of flow paths as well as solid mechanics, solid-fluid interactions in a well system environment.

The example architecture 300 shown in FIG. 3 includes a fluid system 310, a data acquisition system 320, a simulation system 330, and an analysis system 360. The architecture 300 can include additional or different components or subsystems, and the example components shown in FIG. 3 can be combined, integrated, divided, or configured in another manner. For example, the simulation system 330 and the analysis system 360 can be subcomponents of an integrated computing system (e.g., the computing systems 200 shown in FIG. 2) or multiple computing systems; or the data acquisition system 320 can be integrated with the fluid system 310. As another example, the simulation system 330 or the analysis system 360, or both, can be implemented in a computing system that operates independently of the fluid system 310 or the data acquisition system 320.

The example fluid system 310 can be any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can represent the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can be any system or hardware that obtains data from the fluid system 310. For example, the data acquisition system 320 can include flow sensors, acoustic sensors, pressure sensors, temperature sensors, and other types of measurement devices. The data acquisition system 320 can include communication and data storage systems that store, transfer, manipulate, or otherwise manage the information obtained from the fluid system.

The simulation system 330 can be one or more computer systems or computer-implemented programs that simulate fluid flow. The simulation system 330 can receive information related to the fluid system 310 and simulate fluid flow and other phenomena that occur in the fluid system 310. For example, the simulation system 330 can calculate flow velocities, pressures, or other aspects of fluid flow based on data from the data acquisition system 320 or another source. The fluid flow simulation system 300 may also simulate dynamic attributes (e.g., displacements and movements) of mechanical systems (e.g., rock blocks, reservoir media, fractures) or other phenomena coupled to the simulated fluid.

The example simulation system 330 includes fluid system data 332, discrete fracture network (DFN) models 334, and solvers 342. The simulation system can include additional or different features, and the features of a simulation system can be configured to operate in another manner. The modules of the simulation system 330 can include hardware modules, software modules, or other types of modules. In some cases, the modules can be integrated with each other or with other system components. In some example implementations, the simulation system 330 can be implemented as software running on a computing system (e.g., the example computing systems 200 in FIG. 2A), and the modules of the simulation system 330 can be implemented as software functions or routines that are executed by the computing system. In some implementations, one or more software functions or routines can include multiple threads that can be executed by computing system in series or in parallel.

The fluid system data 332 can include any information related to the fluid system 310 or another fluid system. For example, the fluid system data 332 can indicate physical properties (e.g., geometry, surface properties, etc.) of one or more flow paths in the fluid system 310, material properties (e.g., density, viscosity, etc.) of one or more fluids in the fluid system 310, thermodynamic data (e.g., fluid pressures, fluid temperatures, fluid flow rates, etc.) measured at one or more locations in the fluid system 310, and other types of information. The fluid system data 332 can include information received from the data acquisition system 320 and other sources.

The DFN models 334 can include any information or data that can be used to simulate a fracture network in a subterranean region. The DFN models 334 can include a computational model or geometry describing various physical components or subsystems in a subterranean region. The DFN models 334 can include or otherwise be associated with various types of subsystem models for simulating physical components or subsystems in the subterranean region. In some instances, the DFN models 334 include or otherwise be associated with multiple subsystem models, and each subsystem model can represent dynamic attributes of a distinct physical subsystem (e.g., a sub-region) in the subterranean region. For example, a DFN model can include or otherwise be associated with a wellbore subsystem model 335 for modeling fluid flow in a wellbore (e.g., wellbore 102 in FIG. 1) or a wellbore tool, a fracture subsystem model 336 for modeling fluid flow in fractures, a rock-block subsystem model 337 for modeling solid-fluid interactions, a reservoir subsystem model 338 for modeling fluid flow in the reservoir media, a flow-back or leak-off model for modeling fluid flow flow-back or leak-off processes between reservoir rock and adjacent fractures, a proppant transport model for modeling proppant transport in the fluid flow, a perforation model, a friction model, or a combination of these and other types of subsystem models. In some instances, the subsystem models can be connected, for example, by one or more junction models 339 that can provide connection conditions, boundary conditions, or both among the subsystem models. The DFN models 334 can include or otherwise interact with additional or different subsystems models. In some implementations, each subsystem model can include governing equations, spatial and temporal discretization data, or other information. In some examples, the subsystem models 334-339 can include governing flow equations, such as, for example, Navier-Stokes equations or related approximations of Navier-Stokes equations, continuity equations, or other types of flow equations.

The DFN models 334 can include, for example, a graph or a map with edges and vertices representing the various subsystem models. For example, the edges of the DFN models 334 can represent one or more of wellbore subsystem model 335 or fracture subsystem model 336; the vertices of the DFN models 334 can represent one or more junction models 339; and the entities enclosed or formed by multiple edges can represent one or more of a rock-block subsystem model 337 or a reservoir subsystem model 338. The DFN models 334 can include additional or different structure or features for describing subsystem models and for simulating subterranean regions.

In some implementations, each subsystem model can include spatial discretization data, such as, for example, discrete nodes that represent locations of fluid flow along flow paths in the fluid system 310. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The discretization of the subsystem models can be implemented by any suitable algorithm. For example, the system can be discretized according to a finite element model, a finite volume model, finite difference model, or another technique. The system can be discretized in a manner that permits spatial derivatives or partial spatial derivatives to be solved in the discretized spatial domain using numerical methods.

In some implementations, the simulation system 330 can also include a time marching module to perform calculations in a discretized time domain. For example, the governing flow equations may include derivatives or partial derivatives in the time domain, and the time marching module can calculate such quantities based on a time marching algorithm. Example time marching schemes include the backward Euler scheme, the Crank-Nicolson scheme, and others.

The solvers 342 can include any information or modules that can be used to solve a system of equations. For example, the solvers 342 can include one or more of a direct solver, an iterative solver, or another type of solver. In some implementations, the solvers 342 can include one or more solvers specialized for different applications. For example, the solvers 342 can include a general block-matrix solver, a two-thread solver, a multi-thread solver, and a sparse matrix solver. The solvers 342 can include additional or different types of solvers for solving a system of equations. The solver 342 can implement one or more example techniques described in this disclosure. In some implementations, a combination of these and other techniques for solving a system of equations can be implemented in the solver 342.

In some instances, the solvers 342 can solve one or more DFN models 334 for simulating a fracture network in a subterranean region. For example, the solvers 342 can receive inputs from the other components of the simulation system 330 and generate a numerical solution for a variable of interest based on the inputs. The solution can be generated for some or all of the nodes in a discretized spatial domain. For example, the solvers 342 may calculate values of fluid velocity, fluid pressure, or another variable over a spatial domain; the values can be calculated for an individual time step or multiple time steps.

In some implementations, the solvers 342 can solve a global system of equations encompassing multiple diverse aspects (e.g., wellbores, fractures, rock blocks, reservoirs, proppant, etc.) of the fracture network in the subterranean region. In some other implementations, the solvers 342 may first operate on one or more subsystem models independently, for example, by performing internal elimination to obtain a relationship between the internal variables of each subsystem model in terms of the junction variables of the junction models, and then solve the junction variables based on the junction models.

The analysis system 360 can include any systems, components, or modules that analyze, process, use, or access the simulation data generated by the simulation system 330. For example, the analysis system 360 can include a real-time analysis system that displays or otherwise presents fluid data (e.g., to a field engineer, etc.) during an injection treatment. In some cases, the analysis system 360 includes other simulators or a simulation manager that uses the fluid simulation data to simulate other aspects of a well system. For example, the analysis system 360 can be a fracture simulation suite that simulates fracture propagation based on the simulated fluid flow data generated by the simulation system 330. As another example, the analysis system 360 can be a reservoir simulation suite that simulates fluid migration in a reservoir based on the simulated fluid flow data generated by the simulation system 330.

The example architecture 300 can perform a simulation of time-dependent, multi-phase flows under solid-fluid interaction. In some instances, computational geometry involved in flow simulations changes during the simulation, for example, in response to the solid-fluid interactions. The architecture 300 can provide an efficient computational approach to simulate the subterranean region, for example, by strategically dividing simulation of an entire fracture network into multiple subsystem models while maintaining their interactions via joint models and by efficiently solving each subsystem model (e.g., solving a band matrix through multiple threads). The architecture 300 can keep a low overall computational resources requirement. The technique can be applied to other environments.

Figure 4:
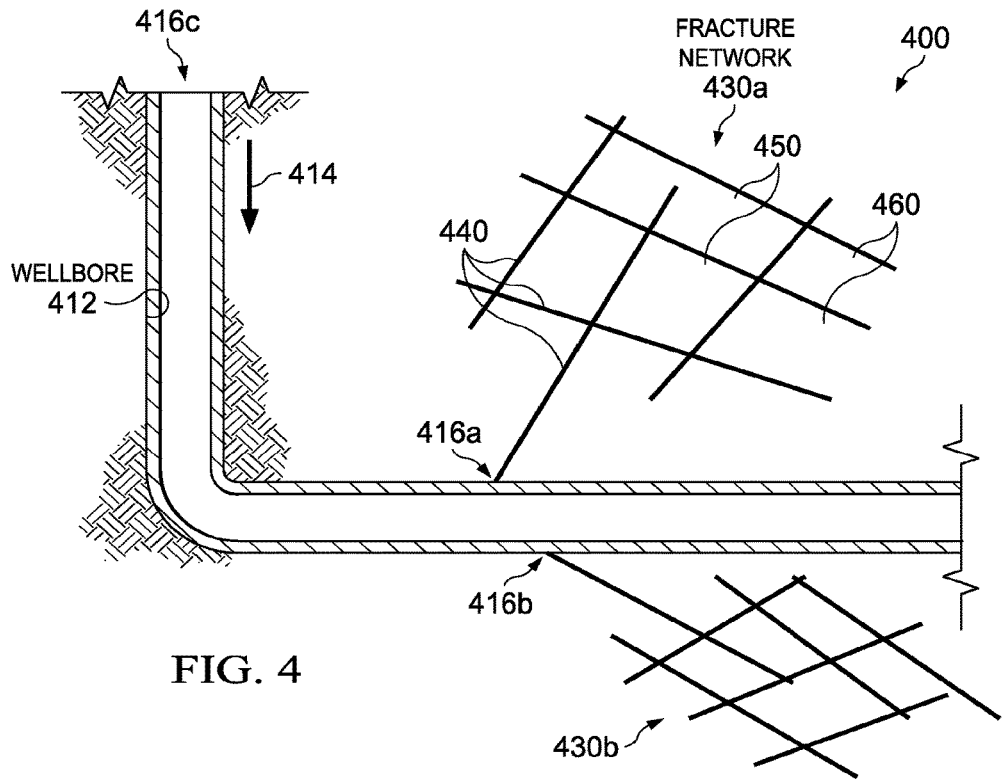
FIG. 4 is a diagram showing aspects of an example subterranean region.

FIG. 4 is a diagram showing an example subterranean region 400. The example subterranean region 400 includes a wellbore 412 and two fracture networks 430a and 430b. During an injection treatment, treatment fluids can flow within the wellbore 412, for example, along the direction of the arrow 414. The high pressure pumping fluids can induce hydraulic fractures (e.g., fractures 440) among rock blocks (e.g., rock blocks 450) and create the fracture networks 430a, 430b in reservoirs 460. The pumping fluids can further extend into the fractures 440 and may be subject to solid-fluid interactions between rock blocks 450.

In some instances, a fracture network (e.g., fracture network 430a) partitions a hydrocarbon reservoir (e.g., reservoir 460) or formation into multiple rock blocks (e.g., rock blocks 450) including the porous reservoir formation. The pores' volumes of the porous reservoir formation can be initially saturated with reservoir fluids (e.g., oil, gas, water, or a combination thereof). Initially, all fractures (e.g., fractures 440) in the fracture network 430a can be closed, the solid rock blocks 450 can be at a structural equilibrium, and the fluids in the porous formation can be at rest. An initial pore pressure distribution and stress field can be assumed known.

The subterranean region 400, which includes the fracture network 430a and 430b, the injection points, and the injection fluids, can be stimulated, for example, by the injection of fracturing fluid, possibly containing proppants, at one or more injection points (e.g., injection points 416a-c) in the fracture networks 430a and 430b. The injection points can include perforation points (e.g., perforation points 416a and 416b) on one or more wellbores (e.g., wellbore 412). The wellbore pressure at the injection point(s) or flow rate from the wellbore to the fracture network at the injection point(s) can be, for example, input to the fracture network.

In some implementations, a subterranean region can be modeled using a discrete fracture network (DFN) model. The DFN model can provide a computational geometric structure that includes or is otherwise associated with multiple subsystem models representing distinct physical components (e.g., fractures, wellbores, rock blocks, reservoirs, etc.) of the subterranean region. For example, each subsystem model can be a physical-mathematical model including governing equations that model dynamic attributes (e.g., including one or more of fluid mechanics, solid mechanics, and fluid-solid interactions) of a physical component of the subterranean region. The DFN model can be used for modeling and simulating a stimulation process for the subterranean region.

In some instances, the DFN model can be a two-dimensional representation of the computational geometry of the physical subterranean region. The DFN model can include multiple edges (or links, lines, etc.) and vertices (e.g., endpoints of the edges and intersections of the edges). In some implementations, the DFN model can be generated and stored, for example, in a compact form as a graph, a tree, a table, or other data structure. For example, the edges can represent wellbore subsystem models and fracture subsystem models that model the physical dynamics of wellbores and fractures in a subterranean region, respectively. The vertices of the DFN model can represent junction models that model interactions between physical components (e.g., fractures, wellbores, rock blocks, etc.) of the subterranean region. For example, a junction model can model an injection or perforation point of the subterranean region. An injection point can lie on a fracture or a wellbore of the subterranean region. Accordingly, a joint model representing physical dynamics of an injection point can be placed on an edge of the DFN model. In the case that an injection point lies within a single fracture, that fracture may be split into two fractures at the injection point. A joint model representing such an injection point can be represented by a vertex of the DFN model where two edges intersect. In some implementations, each fracture subsystem model, represented by an edge of the DFN model, can have two endpoints and thus be associated with two junction models. A junction model can be associated with one or more of fracture subsystem models, wellbore subsystem models, reservoir subsystem models, rock-block subsystem models, etc.

In some implementations, the degree (the number of associated edges) of a vertex of the DFN model can determine the role of the junction model. In some instances, if the degree associated with a junction model is one, then the junction model may enforce the boundary conditions; otherwise, the junction model can enforce the connection conditions. In some instances, the edges and the vertices together can determine rock-block subsystem models and reservoir subsystem models. In this manner, the subsystem models can be identified and represented efficiently. As an example, the edges of the DFN model can partition a 2-dimensional domain into multiple geometric objects (or "closed loops"). The closed loop formed or bounded by multiple edges of the DFN model can represent rock-block or reservoir subsystem models, such as rock-block subsystem models 550 and reservoir subsystem models 560 described below with respect to FIG. 5. In some instance, the rock-block subsystem models and reservoir subsystem models can be defined in another manner. In some instances, all or some of the subsystem models can be represented in an additional or different manner, for example, in a tree, table, or another structure.

Figure 5:
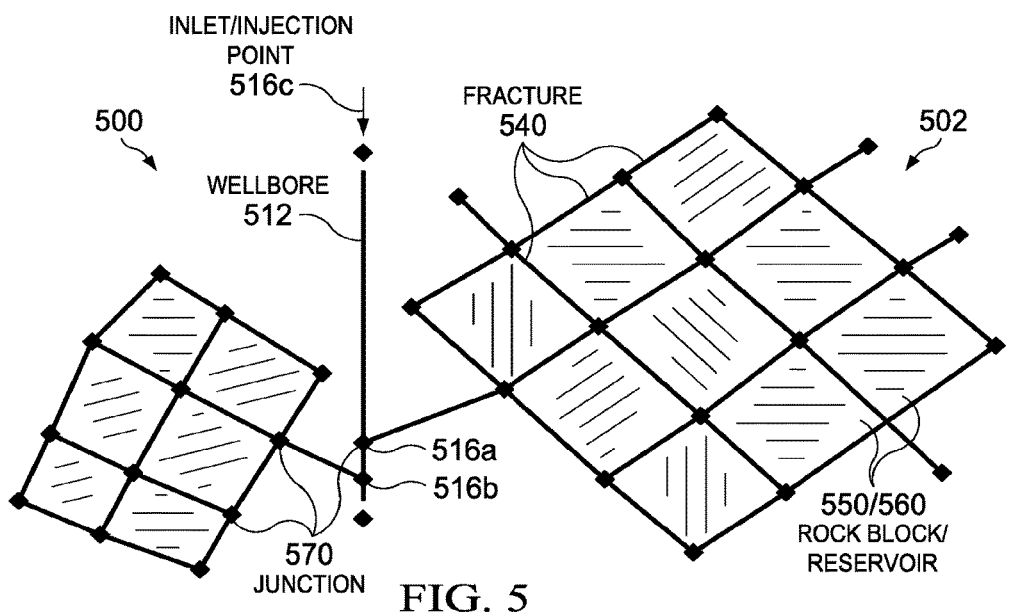
FIG. 5 is a diagram showing aspects of an example computational model of the example subterranean region 400 shown in FIG. 4.

FIG. 5 is a diagram showing aspects of example computational geometry 500 based on the physical geometry of the example subterranean region 400 of FIG. 4. The example computational geometry 500 can be represented by an example two-dimensional discrete fracture network (DFN) model 502. The DFN model 502 includes a wellbore subsystem model 512, fracture subsystem models 540, rock-block subsystem models 550, reservoir subsystem models 560, and junction models 570. The DFN model can include additional or different types of subsystem models. The fracture subsystem models 540, rock-block subsystem models 550, and reservoir subsystem models 560 can represent fluid flow dynamics, solid or mechanical dynamics, or a combination of these and other physical dynamics within or otherwise associated with the multiple fractures 440, rock blocks 450, and reservoirs 460 in FIG. 4, respectively. The junction models 570 can represent the interactions among the subsystem models. For example, the junction models 570 can also include vertices 516a-c that model the injection and perforation points 416a-c of FIG. 4, respectively. In some instances, the rock-block subsystem models 550 and the reservoir subsystem models 560 physically overlap but can be represented as separate subsystem models to capture their respective associated physics. For instance, such representations can separate the fluid dynamics from solid or mechanical dynamics, allowing for implementation of different modeling approaches to each regime.

Among the five example types of subsystem models shown, the wellbore subsystem model 512, fracture subsystem models 540, and reservoir subsystem models 560 can represent the fluid domain. In some implementations, the fluid-domain subsystem models can include different governing flow equations and can carry different numbers of fluid variables. For example, in some cases, proppant concentration equations and variables representing proppant concentration do not appear in the reservoir subsystem model 560, but are incorporated in the other fluid domains (e.g., in the wellbore subsystem model 512 and fracture subsystem model 540). Among the three example types of fluid-domain subsystem models shown in this example, in some instances, only the fracture subsystem model 540 is involved in the solid-fluid interactions. To incorporate such interaction, the fracture subsystem model 540 may involve extra computations compared with the wellbore subsystem model 512 and reservoir subsystem model 560. In some cases, the fracture subsystem model 540 can be the only subsystem model that has direct coupling with all the other subsystem models (e.g., with the wellbore subsystem model 512, rock-block subsystem model 550, and reservoir subsystem model 560).

In some instances, the rock-block subsystem models 550 may carry only the governing equations pertaining to the solid dynamics and take part in the solid-fluid interaction with the fracture subsystem models 540. For example, the rock-block subsystem models 550 can compute displacements resulting from the action of fluid pressure from the fracture and the rock-rock interactions. The displacements can affect the net cross-section area for the flow in the fracture subsystem models 540.

In some implementations, the junction models 570 do not necessarily represent physical junctions or physical subsystems in the subterranean region. In some cases, the junction models 570 would not necessarily appear in a fully coupled two-dimensional or three-dimensional simulation, but it comes into existence, for example, when low spatial dimensions are selected to perform the simulation in a fracture subsystem model 540. The junction model 570 can be included to capture the physics that are not represented by the subsystem model. The junction models 570 can be utilized to enforce conditions, for example, boundary conditions at the domain extremities. One purpose of the junction models 570 is to provide continuity between disconnected entities through connection conditions. Therefore, the junction model 570 can, in some instances, ensure that the global system resulting from combination of the discretization of the governing equations associated with all the subsystem models is a "closed" system.

The connection conditions that a junction model 570 imposes can be based on the fluid domains it connects. For example, when connecting the wellbore to the fracture, the junction model 570 can enforce connection conditions that mimic the characteristics of a perforation point. As another example, when the junction connects thin cross-section fractures, the connection condition may imitate Darcy flow. Thus, the existence of junction model 570 can provide flexibility in terms of the choices of the governing equations in the fluid domains, or another domain. For example, it is possible (and may be desirable) in the wellbore subsystem models 512 and fracture subsystem models 540 to use the Navier-Stoke equation for the wellbore and fractures with a large cross-sectional area (for example, typically around the perforation points), and Darcy or Reynolds type of simplified non-linear governing equations for fractures with a thin cross-sectional area. Additional or different types of governing equations can be chosen by the subsystem models.

In some implementations, a fracture represented by a fracture subsystem model in the DFN model is considered to be opened when the pressure at one or both of its endpoint(s) junction models reaches a minimum threshold for opening fractures. The fracture opening pressure can depend on, for example, formation properties, the stress field, and whether a fracture already exists (naturally or hydraulically induced) or is a newly created fracture.

When a fracture is opened, it can be given some small positive initial aperture and it can contain an appropriate initial fluid mass at an initial pressure, which is consistent with the solid mechanics on neighboring blocks. The fracture opening condition can imply a sufficient pressure value at an endpoint junction model so that the pressure difference between the junction model and the fracture causes the flow into the fracture.

A fracture is closed when its aperture at any point along the fracture becomes less than some small positive threshold. Each open fracture can have a moving boundary and can be assumed to have positive aperture everywhere. The fracture boundary includes the two endpoint junctions and the two neighboring fracture faces, which can be defined by the boundaries of the solid rock blocks. The entire fracture can be occupied by fluid at all times.

Reservoir subsystem models (e.g., reservoir subsystem models 50) can model processes of the fluid flow in the reservoir. For example, fluid can leak off from the fractures to neighboring rock blocks (and vice-versa, also known as flow-back) along the fracture boundaries. Various leak-off/flow-back models, of spatial dimension one, two, or three, can be used. One example leak-off/flow-back model represents the leak-off and flow-back processes through an equation given by:

$$\alpha \bar{p}_t - (\beta \bar{p}_y)_y = 0 \quad (1)$$

Here, $\bar{p}$ denotes the pressure along the leak-off direction y in the formation, which is usually normal to the fracture direction, and $\alpha$ and $\beta$ are the model's parameters which may depend on location. For example, the fracture pressure and the known reservoir pressure can serve as boundary conditions for equation (1). The boundary conditions may be time-dependent. Other possible boundary conditions, for example, include specified pressure field or imposed flow-rates. Other models with increased complexity such as FLIC (Filtration with Linear-Invasion and Crossflow) model can be used.

In some implementations, a DFN model can include one or more fracture subsystem models that model fluid flow in the fractures. In a two-dimensional DFN model, all of the fracture subsystem models and junction models together form a two-dimensional domain for the flow of fluids. Various two-dimensional or three-dimensional fluid flow models can be used in the entire fluid domain. Alternatively or additionally, various fluid flow models can be used inside each individual fracture subsystem model. The fluid flow model for a single fracture can be one-, two-, or three-dimensional. In one example approach, the individual fracture fluid flow models can be coupled by connection conditions at the junction models. Different fluid flow models can be used on different fractures, depending on the flow regime. For example, in fractures near injection points, the full Navier-Stokes equations may be used, while simplified equations may be used in fractures far from injection points with low velocity.

A one-dimensional model for flow in a single fracture or wellbore can be given, for example, by the Reynolds equation:

$$\frac{\partial A\rho}{\partial t} - \frac{\partial}{\partial x}\left(\frac{A^3}{12\mu}\rho\frac{\partial P}{\partial x}\right) + \dot{M} = 0 \quad (2)$$

Here, A is the area of the fracture cross-section area or aperture, $\mu$ is the fluid-proppant mixture viscosity, p represents the pressure along the fracture, t is time, x is the fracture alignment direction, $\rho$ is the fluid-proppant mixture density, and $\dot{M}$ is the mass interaction with the reservoir. The subscripts x and t indicate the derivative with respect to the variable in the subscript, but not the other subscripts f and L. In some instances, this model is appropriate in fractures with low Reynolds numbers and width substantially smaller than the fracture height. The unknown variables are the area A and the pressure p.

A better description of flow for the high Reynolds number regime can be obtained by using one-dimensionalized Navier-Stokes equations:

$$\frac{\partial A\rho}{\partial t} + \frac{\partial A\rho u}{\partial x} + \dot{M} = 0 \quad (3)$$

$$\frac{\partial A\rho u}{\partial t} + \frac{\partial A\rho u^2}{\partial x} + AP_x - \frac{\partial}{\partial x}\mu\frac{\partial Au}{\partial x} + F_p = 0 \quad (4)$$

The above set of equations allows inclusion of desired friction models, for example, Laminar or Turbulent friction models. In some implementations, a combination of Reynolds and Navier-Stoke equations can be used to optimize the performance.

In some implementations, the selected system of equations can be solved by using appropriate boundary conditions for equation (2). Examples for relevant boundary conditions include known flow-rate at the wellbore inlet (or the measured pressure), zero-flow rate at the end of the wellbore (or the measured bottom-hole pressure), and zero flow-rate on the closed end of the fracture (or the known reservoir pressure). Depending on the demand, any combination of the above boundary conditions can be imposed. For example, other one-dimensional flow equations, which may be more physically accurate in more challenging flow regimes, can be derived from the full Navier-Stokes equations by making certain simplifying assumptions. Such equations may involve the fluid pressure and velocity as unknown variables.

In some implementations, a DFN model can include one or more proppant transport models that represent dynamic attributes of proppant transfer in the fractures, wellbores, reservoirs, or other places of the subterranean region. In some applications, proppant may be inserted in the fluid at some of the injection points and transported through the wellbores, fractures, and their inspections or junctions. In some implementations, one or more proppant transport models can be used within individual fractures depending on the application and the desired degree of physical accuracy. The proppant transport can be modeled, for example, using:

(Reynolds Flow Assumption)

$$\frac{\partial A\phi}{\partial t} - \frac{\partial}{\partial x}\left(\frac{A^3}{12\mu}\phi\frac{\partial P}{\partial x}\right) = 0. \quad (5)$$

(Navier Stoke assumption)

-continued $$\frac{\partial A\phi}{\partial t} + \frac{\partial A\phi u}{\partial x} = 0 \qquad (6)$$

If the settling of the proppant due to the gravity is deemed important, then appropriate settling/re-suspension models can be incorporated in the above equations. In the above equations (5) and (6), $\phi$ is the proppant volume fraction. The proppant influence on the fluid properties, such as the viscosity and the density, can be computed using correlations or the tabulated data from experiments as:

$$\mu = f(\phi, P, \dots) \qquad (7)$$

$$\rho = f(\phi, P, \dots) \qquad (8)$$

In some implementations, temperature effects on the flow can be modeled throughout the DFN by including an energy model within individual fractures and at the junctions, or they can be modeled in another manner.

Figure 6:
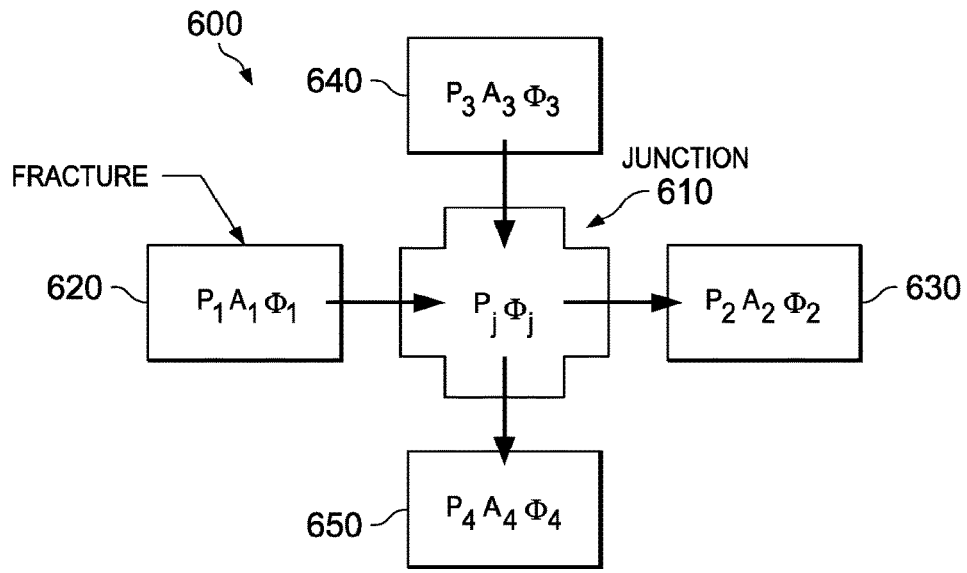
FIG. 6 is a diagram showing aspects of an example junction model.

FIG. 6 is a diagram 600 showing aspects of an example junction model 610. As illustrated, the example junction model 610 couples and models interactions among four fracture subsystem models 620, 630, 640, and 650. The variables $P_i$, $A_i$, $\phi_i$ represent respective facture variables for each fracture subsystem models 620, 630, 640, and 650. The junction model 610 can have junction variables $P_j$, $\phi_j$ that are common variables shared by the two or more of the fracture subsystem models 620, 630, 640, and 650. In general, various fluid continuity conditions can be imposed at the junction models, for example, depending on the type and spatial dimension of the flow equations used to model each individual fracture connected to or otherwise associated with a junction model. These flow connection equations may include fluid, proppant, and energy, in various spatial dimensions. The continuity conditions provide a means for coupling intersecting fractures and coupling fractures with the wellbore, for example, based on the junction variables.

Figure 7:
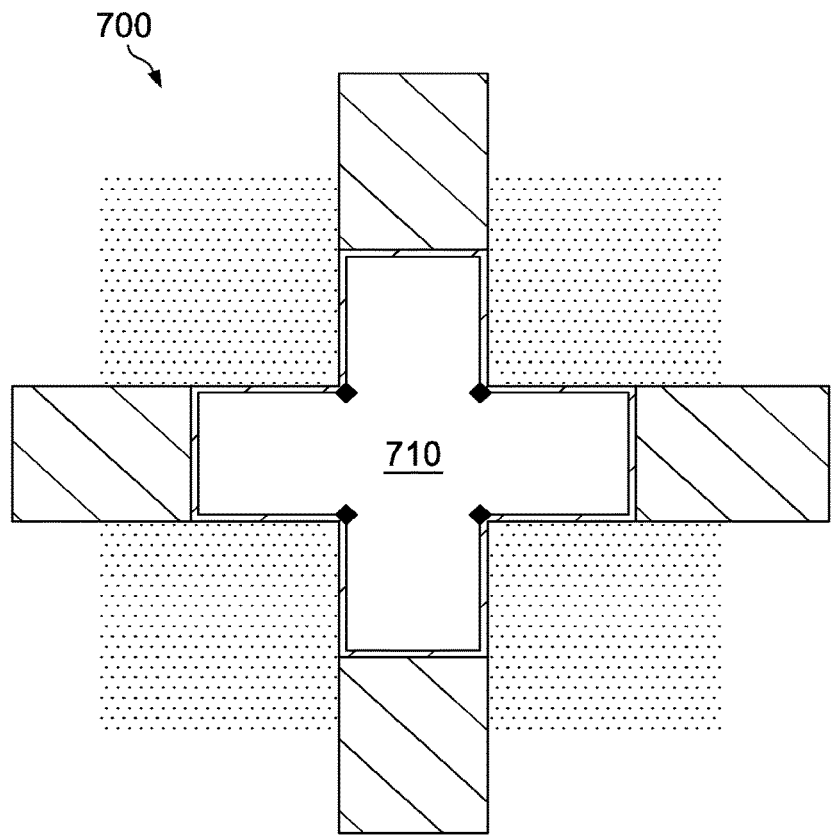
FIG. 7 is a diagram showing aspects of another example junction model.

FIG. 7 is a diagram 700 showing aspects of another example junction model 710. The junction model 710 can have mass transfer interaction with fractures as well as the reservoir and it can be describe, for example, as:

$$\frac{\partial \rho_J A_J}{\partial t} + \sum \rho_{f,i} A_{f,i} u_{f,i} + \sum \dot{M} = 0, \qquad (9)$$

where the terms with subscript j represent the junction variables and the terms with subscript f represent the fracture variables. The reservoir interaction is represented through $\dot{M}$. The area of the junction $A_j$ can be described in terms of the displacements of the corner points on the solid blocks surrounding the junction.

If Reynolds approximation is adapted, then the fracture velocity $u_f$ can be simplified as:

$$\sum u_f = \frac{A_f^2 P_x}{12\mu}. \qquad (10)$$

Additional conditions on the pressure can be imposed in order to complete the connection conditions. Here, for simplicity, an example pressure continuity condition is imposed, given by:

$$P_j = P_f \qquad (11)$$

where $P_f$ is the fracture pressure ($P_1$, $P_2$, $P_3$, and $P_4$ in this example).

Similarly for the proppant, continuity can be enforced by:

$$\frac{\partial \phi_J A_J}{\partial t} + \sum \phi_{f,i} A_{f,i} u_{f,i} = 0 \qquad (12)$$

followed by:

$$\phi_{out} = \phi_j \qquad (13)$$

Many simplifications for the above model can be applied. For example, the interaction with reservoir can be ignored, or the junction area change over time can be assumed to be smaller, etc. Additional or different techniques can be used to impose junction conditions.

In some instance, rock blocks can be deformed by pressure forces from the neighboring fractures acting on the fracture boundaries. The deformation of the rock blocks defines the fracture cross-section area A. Various models can be used to model the solid mechanics of individual rock blocks. Constraints can be applied to the blocks adjacent to the boundary of the reservoir. For example, the rock-block subsystem model can be based on discontinuous deformation analysis (DDA). Alternatively or additionally, a finite element method (FEM) can be used. For each discrete block in fracture network, a system of time-dependent equations can be formulated for rock dynamics using FEM as the following equation:

$$M\ddot{x} + C\dot{x} + Kx = F \qquad (14).$$

Here, M is assembled mass matrix, C is damping matrix, K is stiffness matrix, x is displacements vector, and F is force vector. The total force applied on a side of a block by a fracture's flow can be calculated as an integral of pressure along the fracture. This force provides a force boundary condition for each block. Finite element meshes used for individual block could be, for example, pre-determined by a user or optimized by accuracy or computational cost requirements. Because the fracture is formed by two adjacent blocks' surfaces, the fracture cross-section area A equals the displacement differences between these two block surfaces times fracture height, where the displacement vector x can be given or calculated for the adjacent blocks.

The fracture cross-section area A appears in the fracture flow equations, yet it can be explicitly defined, for example, in terms of the rock block deformations, or the displacement vector x. Therefore, the area may need to be defined in a consistent way with the fracture subsystem models and rock-block subsystem models. The fracture subsystem models can allow the area to vary at each computational point along the fracture, and the rock-block subsystem models can allow deformations to affect the area in a piecewise polynomial manner. Depending on the relation between the computational grids in the fracture and the boundaries of the neighboring rock blocks, the shape functions of the rock block displacement vector may restrict the fracture area to a low-dimensional space, leading to constraints on the fracture geometry. For example, a simple rock-block subsystem model can be linear elasticity discretized by piecewise linear finite element shape functions on the coarsest possible triangulation of the block. Thus, each fracture on the boundary of the block would coincide with one edge of a triangle in the triangulation of the block, so displacement would be linear along the entire fracture, leading to a linear model of the fracture aperture. For example, in other discretization, a finer grid of the rock blocks or higher-order displacement shape functions may be used, leading to a higher-order piecewise polynomial model for the area, while using appropriate grids for the fracture, which are determined by the neighboring rock block grids.

In some instances, the deformation of the blocks may cause the fracture cross-section area, in one or more of its computational points, to shrink to zero or become negative. The suggested model declares this fracture to be closed, with zero area along its boundaries, or, alternatively, it can be split into multiple fractures. A contact point or contact region can be defined for the touching blocks, and a constraint can be imposed on those blocks. Such constraints could be continuous physical models to describe the behavior of fracture between penetration (closed fracture) and separation (opened fracture), non-penetration conditions between contacting rock blocks preventing any overlap between rock blocks, or other conditions.

FIG. 8 is a diagram 800 showing aspects of an example perforation area 810 of a wellbore 820. In some implementations, a DFN model can include one or more perforation models that model dynamics of a part of the wellbore region where the casing has been perforated. In some implementations, since the perforation holes can be been intentionally created, the number n of perforation holes 830 created and their size distribution estimation r can be available. Based on these parameters, an affective area for the flow area can be obtained as:

$$A_p = n\pi \bar{r}^2 \quad (15).$$

The net pressure drop across the perforation can be computed using:

$$Q = C_D A_P \sqrt{\frac{\Delta p}{\rho}} \quad (16)$$

where $C_D$ represents the pressure loss coefficient and Q is the volumetric flow rate Typically, a wellbore is a cylindrical shaft of varying diameter that connects the fracture network to the surface of a subterranean region. Different stimulation treatments can be applied or the production can be collected through the wellbore. In some implementations, same or similar governing equations as the fracture subsystem models can be used for the wellbore subsystem models. As such, uniformity of the governing equations can be established and the usual practice of employing algebraic equations for the wellbore can be avoided. In some instances, the main difference between the fracture and the wellbore is that there is no fluid-solid interaction for the wellbore (thus, no cross-sectional change) and no direct coupling with the reservoir (hence no leak-off/flow-back models needed) for the wellbore. Also, the momentum equation in the governing equation of the wellbore subsystem can involve terms due to the gravitational forces. In some implementations, friction models used in the wellbore subsystem models can be different from those used for the fracture subsystem models.

In some implementations, friction models can be used to model the frictions of the well system fluid flowing through, for example, wellbores, fractures, or other physical components of a subterranean region. Various friction models with respective governing equations can be chosen. In general, existing friction models are either applicable only under laminar or under turbulent conditions and there are no transition models provided. An example technique is provided that smoothly unifies these two categories of friction models to alleviate the numerical and physical issues associated with transitional flows encountered in the hydraulic fracturing simulations.

Let $f_L$ and $f_T$ be the friction factor models developed for laminar and turbulent flows, respectively. Then, a hybrid model can be derived as:

$$f_H = f_L \alpha + (1-\alpha) f_R \quad (17).$$

The hybrid factor α should vary smoothly across the transitional Reynolds number $Re_\tau$. The transitional Reynolds number may be known a priori or can be computed solving $f_L(Re_\tau) - f_R(Re_\tau) = 0$. In some implementations, many hybrid factors can be constructed, for example, as given below:

$$\alpha = \frac{1}{2}\left[1 + \tanh\left(\frac{Re_\tau - Re}{\Delta Re}\right)\right]. \quad (18)$$

In the above equation (18), ΔRe represents the region around $Re_\tau$ where hybrid factor plays an important role.

FIG. 9 is a plot 900 showing an example hybrid friction model 910 obtained based on an example laminar model 920 and turbulent model 930 for pipe flows, according to equations (17) and (18).

Figure 10:
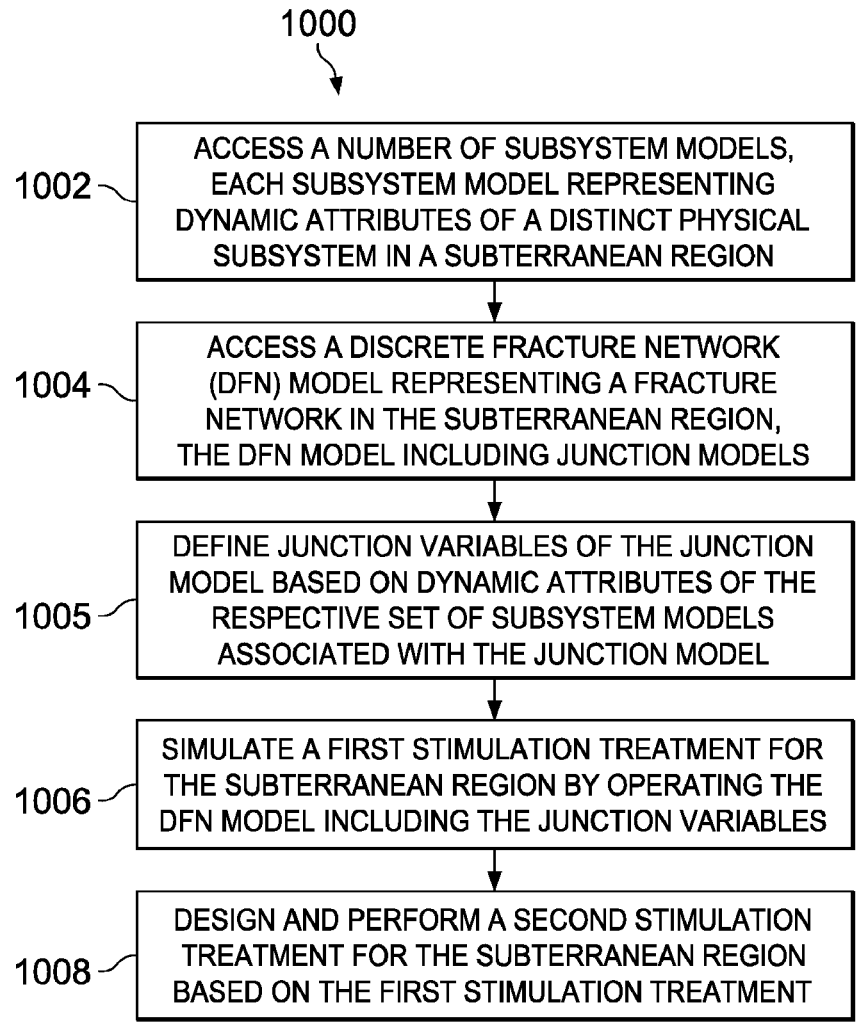
FIG. 10 is a flow chart showing an example process for modeling and simulating a subterranean region.

FIG. 10 is a flow chart showing an example process 1000 for modeling and simulating a subterranean region. For example, the example process 1000 can be used to simulate a stimulation treatment in the example subterranean region 104 of FIG. 1. All or part of the example process 1000 may be computer-implemented, for example, using the features and attributes of the example computing system 200 shown in FIG. 2 or other computing systems. The process 1000, individual operations of the process 1000, or groups of operations may be iterated or performed in parallel, in series, or in another manner. In some cases, the process 1000 may include the same, additional, fewer, or different operations performed in the same or a different order.

The example process 1000 can be used to simulate fluid flow in a variety of physical components or subsystems of a subterranean region. In some implementations, the process 1000 is used to simulate flow in a fluid injection or production system (e.g., in a wellbore, in a flow control device or flow conduit installed in a wellbore, etc.), within a subterranean formation (e.g., from a wellbore into reservoir media, through a rock matrix in the reservoir media, through fractures or discontinuities in the reservoir media, etc.), or combinations thereof. For example, the process 1000 can be used to simulate the example fracture networks shown in FIG. 5. The process 1000 may also be used to simulate flow in other environments, for example, outside the context of a well system. In some cases, some or all of the operations in the example process 1000 can be implemented by a direct or iterative solver in a simulation system.

The example process 1000 can be used to simulate the flow of various fluids. In some cases, the process 1000 is used to simulate one or more well system fluids. Here, the term "well system fluid" is used broadly to encompass a wide variety of fluids that may be found in or near, or may be used in connection with, a well system. Well system fluids can include one or more native fluids that reside in a subterranean region (e.g., brine, oil, natural gas, etc.), one or more fluids that have been or will be injected into a subterranean region (e.g., fracturing fluids, treatment fluids, etc.), one or more fluids that have been or will be communicated within a wellbore or within one or more tools installed in the wellbore (e.g., drilling fluids, hydraulic fluids, etc.), and other types of fluids.

In some implementations, some or all of the operations in the process 1000 are executed in real time during a treatment or another type of well system activity. An operation can be performed in real time, for example, by performing the operation in response to receiving data (e.g., from a sensor or monitoring system) without substantial delay. Also, an operation can be performed in real time by performing the operation while monitoring for additional data (e.g., from a treatment or other activities). Some real-time operations can receive an input and produce an output during a treatment; in some instances, the output is made available to a user within a time frame that allows the user to respond to the output, for example, by modifying the treatment.

At 1002, a number of subsystem models can be accessed at a computer system. Each subsystem model can represent dynamic attributes of a distinct physical subsystem in a subterranean region. For example, each subsystem model can include a respective governing equation and variables to model the geomechanical and geophysical dynamics (e.g., including one or more of fluid mechanics, solid mechanics, and fluid-solid interactions) of the distinct physical subsystem. The dynamic attributes can include one or more of a spatially varying, a temporal varying, or other types of attributes of the physical subsystem. The computer system can access the subsystem models, for example, by reading them from a memory, a database or another medium, or by receiving them from a user interface, a communication link, or another source.

The subsystem models can include one or more of a fracture subsystem model, a wellbore subsystem model, a reservoir subsystem model, a rock block subsystem, a fluid flow model, a junction model, a proppant transport subsystem model, a perforation model, or a friction model. In some instances, at least one of the number of subsystem models represents dynamic attributes of a mechanical subsystem (e.g., a rock block subsystem or any other subsystem involving one or more of solid dynamics, or fluid-solid interactions of underlying physical subsystems) in the subterranean region.

At 1004, a discrete fracture network (DFN) model representing a fracture network in the subterranean region can be accessed at the computer system. In some implementations, the DFN model can be generated, for example, automatically by a computer system or manually, to abstract a computational geometry (e.g., the DFN model 502 in FIG. 5) based on the physical geometry of the subterranean region (e.g., the subterranean region 400 in FIG. 4). The DFN model can be a 1D, 2D, or higher-dimensional model. The DFN model can serve as the basic computational structure for simulating the subterranean region and the subsystem models can be incorporated or otherwise associated with the DFN model. The DFN model can include junction models (for example, as vertices of the DFN model). Each junction model can represent interactions between a respective set of subsystem models associated with the junction model. In some implementations, the DFN model can be represented or stored in a graph, a network, a map, or another data structure. The computer system can access the DFN model by reading it from a memory, a database or another medium, or by receiving it from a user interface, a communication link, or another source.

At 1005, junction variables of the junction model can be defined based on dynamic attributes of the respective set of subsystem models associated with the junction model. For example, the junction variables can be defined as the common variables (e.g., $P_i$, $\phi_i$ in FIG. 6) shared by the set of subsystem models (e.g., fracture subsystem models 620, 630, 640, and 650) associated with the junction model (e.g., junction model 610). In some implementations, the junction variables can include variables that represent boundary conditions, continuity conditions, or other interactions of the set of subsystem models associated with the junction model, for example, as described with respect to FIGS. 6 and 7 or in another manner.

At 1006, a stimulation treatment for the subterranean region can be simulated by operating the DFN model including the junction variables. In some implementations, simulating the stimulation treatment can include numerically solving or otherwise operating the DFN model together with the number of subsystem models. In some implementations, operating the DFN model including the junction variables includes simplifying one or more of the subsystem models using the junction variables. In some implementations, simplifying the subsystem models using the junction variables can include reducing the number of variables of the subsystem models, changing the structures of the subsystem models (e.g., changing the matrix representation of the governing equation), or otherwise reducing the complexity for solving the subsystem models based on the junction variables. For instance, the number of junction variables in a junction model can be less than the number of variable of the associated subsystem models. In some implementations, a junction model can be represented by a sparse matrix including the junction variables and can be solved more easily than directly solving the multiple subsystem models associated with the junction model. With the solved or known junction variables, the number of variables and the dimensions of the individual subsystem models can be reduced, for example, by representing them using the junction variables; or the matrix representation of the individual subsystem models can be improved (e.g., becoming banded or diagonal matrices) such that the individual subsystem models can be solved more easily based on the solved or known junction variables. By operating the DFN model including the junction variables in such a hierarchical manner, the computational complexity of simulating the subterranean region can be significantly reduced.

In some implementations, operating the DFN model including the junction variables includes discretizing the subsystem models using respective numerical discretization methods (e.g., finite differences, finite elements, finite volumes, spectral methods); and operating the DFN model including the junction variables regardless of the numerical discretization methods used for the subsystem models. In some implementations, the representations of governing equations, the orders or levels of discretization, the numerical discretization techniques, or other features of the individual subsystem models can be determined independently of each other. In some implementations, simplifying the subsystem models using the junction variables and solving for the junction models can be performed regardless of the numerical methods used to discretize or solve the individual subsystems. For example, the discretized subsystem model describing the solid mechanics (e.g., a rock block subsystem model) can be reduced in terms of junction variables irrespective of whether, for example, finite elements or finite difference is used.

At 1008, a second stimulation treatment for the subterranean region can be designed and performed based on a first stimulation treatment that has been simulated according to the operations 1002-1006. In some implementations, the simulation results of the first stimulation treatment can provide a description of the width, length, location and orientation of the fractures, stimulate reservoir volume, production efficiency, or other attributes of the subterranean region. Based on the simulation results of the first stimulation treatment, a second stimulation treatment (e.g., a new injection treatment or an additional injection treatment for a new stage of a multi-stage injection treatment) can be designed or otherwise modified, for example, to obtain desired attributes of the subterranean region. The second stimulation treatment can be performed, for example, using the example well system 100 shown in FIG. 1 or other systems.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other implementations are within the scope of the following claims.

The invention claimed is:

1. A subterranean region simulation method comprising:
accessing, at a computer system, a plurality of subsystem models, each subsystem model representing dynamic attributes of a distinct physical subsystem in a subterranean region, at least one of the plurality of subsystem models representing dynamic attributes of a mechanical subsystem in the subterranean region;
accessing, at the computer system, a discrete fracture network (DFN) model representing a fracture network in the subterranean region, the DFN model comprising junction models, each junction model representing interactions between a respective set of subsystem models associated with the junction model, wherein said junction model uses a Navier-Stokes equation to model fluid flow and connects one or more joints to each other, and wherein said DFN model includes a leak-off model;
defining, by operation of the computer system, junction variables of the junction model based on dynamic attributes of the respective set of subsystem models associated with the junction model, wherein conservation equations of the DFN model are explicitly satisfied with the junction models defined using the junction variables;
simulating, by operation of the computer system, a first stimulation treatment for the subterranean region by operating the DFN model comprising the junction variables, wherein said simulating is used to control an injection treatment by generating a pumping schedule in advance of the injection treatment or by modifying an existing fracture treatment plan in real time during the injection treatment;
simulating, by operation of the computer system, a second stimulation treatment for the subterranean region based on the first stimulation treatment; and
performing the second stimulation treatment for the subterranean region.

2. The method of claim 1, further comprising generating the DFN model.

3. The method of claim 1, wherein at least one of the plurality of subsystem models representing dynamic attributes of a mechanical subsystem comprises a rock-block subsystem model.

4. The method of claim 1, wherein the subsystem models comprise one or more of a fracture subsystem model, a wellbore subsystem model, a reservoir subsystem model, a rock-block subsystem, a fluid flow model, a junction model, a proppant transport subsystem model, a perforation model, or a friction model.

5. The method of claim 1, wherein operating the DFN model comprising the junction variables comprises numerically simplifying one or more of the plurality of subsystem models using the junction variables.

6. The method of claim 1, wherein operating the DFN model comprising the junction variables comprises:
discretizing the plurality of subsystem models using respective numerical discretization methods; and
simplifying the plurality of subsystem models regardless of the numerical discretization methods used for the plurality of subsystem models.

7. A non-transitory computer-readable medium storing instructions that, when executed by data processing apparatus, cause the data processing apparatus to perform operations comprising:
accessing a plurality of subsystem models, each subsystem model representing dynamic attributes of a distinct physical subsystem in a subterranean region, at least one of the plurality of subsystem models representing dynamic attributes of a mechanical subsystem in the subterranean region;
accessing a discrete fracture network (DFN) model representing a fracture network in the subterranean region, the DFN model comprising junction models, each junction model representing interactions between a respective set of subsystem models associated with the junction model, wherein said junction model uses a Navier-Stokes equation to model fluid flow and connects one or more joints to each other, and wherein said DFN model includes a leak-off model;
defining junction variables of the junction model based on dynamic attributes of the respective set of subsystem models associated with the junction model, wherein conservation equations of the DFN model are explicitly satisfied with the junction models defined using the junction variables;
simulating a first stimulation treatment for the subterranean region by operating the DFN model comprising the junction variables, wherein said simulating is used to control an injection treatment by generating a pumping schedule in advance of the injection treatment or by modifying an existing fracture treatment plan in real time during the injection treatment; and
simulating a second stimulation treatment for the subterranean region based on the first stimulation treatment, the second stimulation treatment being performed subsequent the simulation of the second stimulation treatment.

8. The non-transitory computer-readable medium of claim 7, the operations further comprising generating the DFN model.

9. The non-transitory computer-readable medium of claim 7, wherein at least one of the plurality of subsystem models representing dynamic attributes of a mechanical subsystem comprises a rock-block subsystem model.

10. The non-transitory computer-readable medium of claim 7, wherein the subsystem models comprise one or more of a fracture subsystem model, a wellbore subsystem model, a reservoir subsystem model, a rock-block subsystem, a fluid flow model, a junction model, a proppant transport subsystem model, a perforation model, or a friction model.

11. The non-transitory computer-readable medium of claim 7, wherein operating the DFN model comprising the junction variables comprises numerically simplifying one or more of the plurality of subsystem models using the junction variables.

12. The non-transitory computer-readable medium of claim 7, wherein operating the DFN model comprising the junction variables comprises:
discretizing the plurality of subsystem models using respective numerical discretization methods; and
simplifying the plurality of subsystem models regardless of the numerical discretization methods used for the plurality of subsystem models.

13. A computing system comprising
data processing apparatus; and memory storing computer-readable instructions that, when executed by the data processing apparatus, cause the data processing apparatus to perform operations comprising:
- accessing a plurality of subsystem models, each subsystem model representing dynamic attributes of a distinct physical subsystem in a subterranean region, at least one of the plurality of subsystem models representing dynamic attributes of a mechanical subsystem in the subterranean region;
- accessing a discrete fracture network (DFN) model representing a fracture network in the subterranean region, the DFN model comprising junction models, each junction model representing interactions between a respective set of subsystem models associated with the junction model, wherein said junction model uses a Navier-Stokes equation to model fluid flow and connects one or more joints to each other, and wherein said DFN model includes a leak-off model;
- defining junction variables of the junction model based on dynamic attributes of the respective set of subsystem models associated with the junction model, wherein conservation equations of the DFN model are explicitly satisfied with the junction models defined using the junction variables;
- simulating a first stimulation treatment for the subterranean region by operating the DFN model comprising the junction variables, wherein said simulating is used to control an injection treatment by generating a pumping schedule in advance of the injection treatment or by modifying an existing fracture treatment plan in real time during the injection treatment; and
- simulating a second stimulation treatment for the subterranean region based on the first stimulation treatment, the second stimulation treatment being performed subsequent the simulation of the second stimulation treatment.

14. The system of claim 13, the operations further comprising generating the DFN model.

15. The system of claim 13, wherein at least one of the plurality of subsystem models representing dynamic attributes of a mechanical subsystem comprises a rock-block subsystem model.

16. The system of claim 13, wherein the subsystem models comprise one or more of a fracture subsystem model, a wellbore subsystem model, a reservoir subsystem model, a rock-block subsystem, a fluid flow model, a junction model, a proppant transport subsystem model, a perforation model, or a friction model.

17. The system of claim 13, wherein operating the DFN model comprising the junction variables comprises numerically simplifying one or more of the plurality of subsystem models using the junction variables.

18. The system of claim 13, wherein operating the DFN model comprising the junction variables comprises:
- discretizing the plurality of subsystem models using respective numerical discretization methods; and
- simplifying the plurality of subsystem models regardless of the numerical discretization methods used for the plurality of subsystem models.

* * * * *